United States Patent
Xu et al.

(10) Patent No.: US 9,606,912 B2
(45) Date of Patent: Mar. 28, 2017

(54) TRACKING AND UTILIZING SECOND LEVEL MAP INDEX FOR RECYCLING OF SOLID STATE DRIVE BLOCKS

(71) Applicant: LSI Corporation, San Jose, CA (US)

(72) Inventors: Peng Xu, Shanghai (CN); Alex Ga Hing Tang, San Jose, CA (US); LiZhao Ma, Shanghai (CN); Nanshan Shu, Shanghai (CN)

(73) Assignee: Seagate Technology LLC, Cupertino, CA (US)

( * ) Notice: Subject to any disclaimer, the term of this patent is extended or adjusted under 35 U.S.C. 154(b) by 318 days.

(21) Appl. No.: 14/092,285

(22) Filed: Nov. 27, 2013

(65) Prior Publication Data
US 2015/0120989 A1  Apr. 30, 2015

(30) Foreign Application Priority Data
Oct. 31, 2013  (CN) .......................... 2013 1 0529526

(51) Int. Cl.
*G06F 12/00* (2006.01)
*G06F 12/02* (2006.01)

(52) U.S. Cl.
CPC .. *G06F 12/0246* (2013.01); *G06F 2212/7205* (2013.01); *G06F 2212/7208* (2013.01)

(58) Field of Classification Search
None
See application file for complete search history.

(56) References Cited

U.S. PATENT DOCUMENTS

| | | | | |
|---|---|---|---|---|
| 6,377,500 B1 * | 4/2002 | Fujimoto | ............ | G06F 12/0246 365/230.01 |
| 7,734,891 B2 * | 6/2010 | Wong | .................. | G06F 12/0246 711/103 |
| 8,972,650 B2 * | 3/2015 | Post | .................... | G06F 12/0246 711/103 |
| 2007/0204128 A1 * | 8/2007 | Lee | ..................... | G06F 12/0246 711/173 |
| 2011/0055458 A1 * | 3/2011 | Kuehne | ............... | G06F 12/0246 711/103 |
| 2011/0072028 A1 * | 3/2011 | Rousseau | ............ | G06F 12/0246 707/758 |
| 2011/0106804 A1 * | 5/2011 | Keeler | .................... | G06F 3/061 707/737 |
| 2011/0161563 A1 * | 6/2011 | Chang | ................. | G06F 12/0246 711/103 |

(Continued)

*Primary Examiner* — Kaushikkumar Patel
(74) *Attorney, Agent, or Firm* — Suiter Swantz pc llo

(57) ABSTRACT

A recycling method for a solid state drive is disclosed. The method includes selecting a logical block for recycle wherein the logical block includes a plurality of pages across a plurality of flash dies. The method also includes retrieving an address map index record associated with the logical block selected for recycle. For each particular address map index stored in the address map index record, the recycling method retrieves a set of address map entries referenced by the particular address map index, determines whether any page in the logical block is referenced by the set of address map entries, and if at least one page in the logical block is referenced by the set of address map entries, the method writes the at least one page to a different logical block. The method further includes erasing the plurality of pages in the logical block.

20 Claims, 5 Drawing Sheets

(56) References Cited

U.S. PATENT DOCUMENTS

| | | | |
|---|---|---|---|
| 2012/0096217 A1* | 4/2012 | Son | G06F 12/0246 711/103 |
| 2012/0239855 A1* | 9/2012 | Tootoonchian | G06F 12/1009 711/103 |
| 2013/0124932 A1 | 5/2013 | Schuh et al. | |
| 2013/0275660 A1* | 10/2013 | Bennett | G06F 12/0292 711/103 |
| 2013/0326121 A1* | 12/2013 | Cheng | G06F 12/0246 711/103 |
| 2014/0068152 A1* | 3/2014 | Sinclair | G06F 12/0246 711/103 |
| 2014/0082031 A1* | 3/2014 | Chun | G06F 12/0253 707/824 |
| 2014/0095827 A1* | 4/2014 | Wei | G06F 12/0246 711/203 |
| 2014/0157083 A1* | 6/2014 | Shalvi | G06F 11/14 714/763 |
| 2014/0207997 A1* | 7/2014 | Peterson | G06F 12/0246 711/103 |
| 2015/0085577 A1* | 3/2015 | Suzuki | G06F 3/0616 365/185.12 |

\* cited by examiner

TRACKING AND UTILIZING SECOND LEVEL MAP INDEX FOR RECYCLING OF SOLID STATE DRIVE BLOCKS

CROSS-REFERENCE TO RELATED APPLICATIONS

The present application claims priority based on Chinese Application No. 201310529526.4 filed Oct. 31, 2013, the disclosure of which is hereby incorporated by reference in its entirety.

TECHNICAL FIELD

The present invention relates to the field of data storage and particularly to solid state storage devices.

BACKGROUND

A solid state drive (SSD) is a data storage device using integrated circuit assemblies as memory to store data persistently. SSDs have no moving mechanical components, which distinguish them from traditional electromechanical magnetic disks such as hard disk drives or floppy disks. Compared with electromechanical disks, SSDs are typically less susceptible to physical shock, run more quietly, have lower access time, and less latency.

SUMMARY

Accordingly, an embodiment of the present disclosure is directed to a recycling method for a solid state drive. The method includes selecting a logical block for recycle wherein the logical block includes a plurality of pages across a plurality of flash dies. The method also includes retrieving an address map index record associated with the logical block selected for recycle. For each particular address map index stored in the address map index record, the recycling method retrieves a set of address map entries referenced by the particular address map index, determines whether any page in the logical block is referenced by the set of address map entries, and if at least one page in the logical block is referenced by the set of address map entries, the method writes the at least one page to a different logical block. The method further includes erasing the plurality of pages in the logical block.

A further embodiment of the present disclosure is directed to a recycling method for a solid state drive which utilizes a two level map for tracking logical address to physical address mapping. The method includes selecting a logical block for recycle wherein the logical block includes a plurality of pages across a plurality of flash dies. The method also includes retrieving a second level map (SLM) index record associated with the logical block selected for recycle. For each particular SLM index stored in the SLM index record, recycling method retrieves a SLM page referenced by the particular SLM index, determines whether any page in the logical block is referenced by map entries in the SLM page, and if at least one page in the logical block is referenced by the map entries in the SLM page, the method writes the at least one page to a different logical block. The method further includes erasing the plurality of pages in the logical block.

An additional embodiment of the present disclosure is directed to a solid state drive. The solid state drive includes a plurality of flash dies. Each of the plurality of flash dies includes a plurality of blocks, and each of the plurality of blocks further includes a plurality of pages for providing data storage. The solid state drive also includes a controller for managing a recycle operation for the solid state drive. The recycle operation is performed in units of logical blocks, and the controller performs the recycling process in accordance with the recycling methods described above.

It is to be understood that both the foregoing general description and the following detailed description are exemplary and explanatory only and are not necessarily restrictive of the invention as claimed. The accompanying drawings, which are incorporated in and constitute a part of the specification, illustrate embodiments of the invention and together with the general description, serve to explain the principles of the invention.

BRIEF DESCRIPTION OF THE DRAWINGS

The numerous advantages of the present invention may be better understood by those skilled in the art by reference to the accompanying figures in which.

DETAILED DESCRIPTION

Reference will now be made in detail to the presently preferred embodiments of the invention, examples of which are illustrated in the accompanying drawings.

A solid state drive (SSD) uses integrated circuit assemblies as memory to store data persistently. For example, flash memory devices (e.g., NAND type flash memory and the like) can be used as the storage media. A NAND flash memory stores information in an array of memory cells made from floating gate transistors. In traditional single-level cell (SLC) devices, each cell stores only one bit of information. Some newer flash memory, known as multi-level cell (MLC) devices, including triple-level cell (TLC) devices, can store more than one bit per cell by choosing between multiple levels of electrical charge to apply to the floating gates of its cells.

A typical flash memory consists of multiple blocks, and each block contains multiple pages. The basic flash memory read/write unit is a page, which is typically 8 KB in an exemplary implementation. In a conventional implementation, before data can be written to a particular page, the page must first be erased, and the erasing process is performed one block at a time. Therefore, when new data needs to be rewritten to a particular page, the entire block containing that particular page must be erased first. It is contemplated that the pages referenced above can be addressed using physical page address schemes or logical page address (LPA) schemes.

Figure 1:
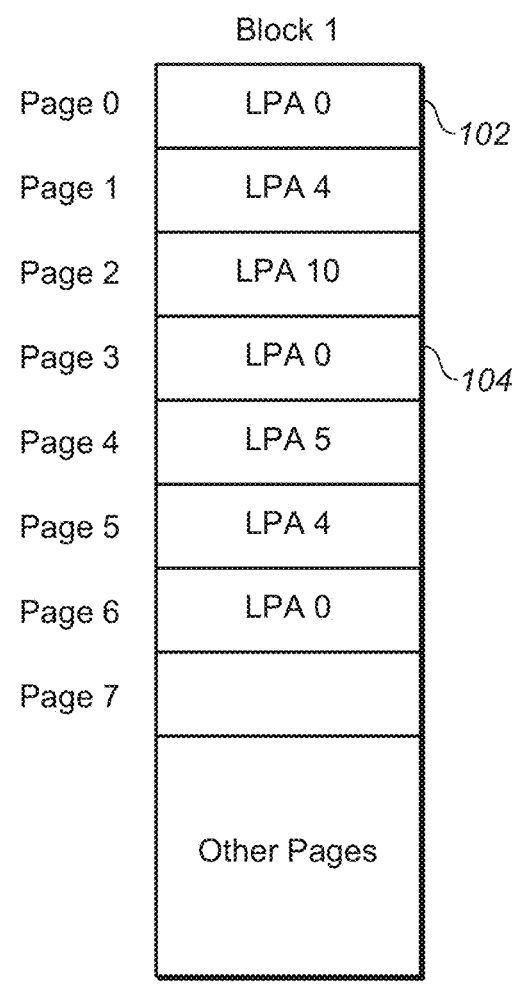
FIG. 1 is an illustration depicting a data block of a solid state drive.

FIG. 1 is an illustration depicting a series of write requests issued to a flash memory. For example, LPA 0 is written to Page 0 at instance 102. Subsequently, LPA 4 and LPA 10 are written to Page 1 and Page 2, respectively. If the data requester (e.g., host) needs to write LPA 0 again, the new data needs to be written to another page. In this example, the new data is written to Page 3, referenced by 104 as shown. At this point, LPA 0 is stored in Page 3, and the next time when the host reads LPA 0, the firmware of the SSD knows that it should read from Page 3 instead of Page 0 (i.e., the first instance is no longer valid). In this case, the data contained in Page 0 is called garbage.

Figure 2:
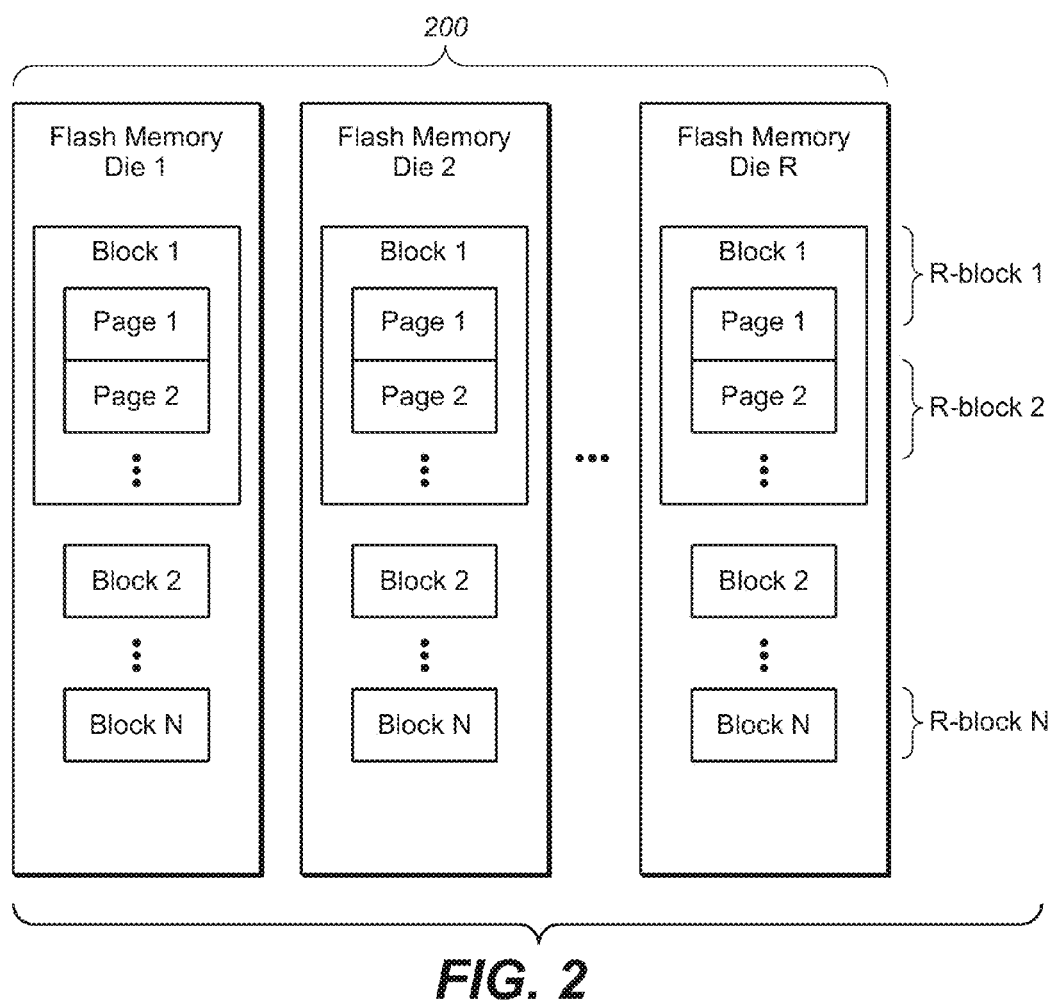
FIG. 2 is an illustration depicting blocks and pages of multiple flash memory dies/chips managed in logical slices and/or sections (referred to as R-blocks)

It is noted that the pages storing data instances that are no longer valid are not usable until they are freed/erased. However, while data is written to the SSD in units referred to as pages (made up of multiple cells), the SSD can only be erased in larger units called blocks (made up of multiple pages). Furthermore, in certain implementations, multiple pages located in blocks across different flash memory dies/chips are managed in logical slices and/or sections as illustrated in FIG. 2. Such logical slices and/or sections are referred to as R-blocks (or logical blocks) in the present disclosure. As shown in FIG. 2, an R-block is exemplified as a logical slice or section across all dies of a flash memory 200. For example, in a SSD having R flash dies, each flash die having N blocks, each R-block is the $i^{th}$ block from each of the flash die logically grouped together, for a total of N R-blocks. For another example, in a SSD having R flash dies, each with N blocks, each R-block is the $i^{th}$ and $(i+1)^{th}$ block from each of the flash die, for a total of N/2 R-blocks. It is contemplated that the exemplary R-blocks described above are for illustrative purposes. Blocks across at least two flash memory dies/chips can be arranged and managed in logical slices and/or sections in various other manners without departing from the spirit and scope of the present disclosure.

As a host (data requester) continues to write data to a SSD, lots of LPAs will be rewritten, and each rewritten LPA will be stored in a different location. The SSD firmware/controller (hereinafter referred to as controller) must track the newest locations of the LPAs in order to function properly. In certain embodiments, address maps are maintained to record mappings between the LPAs and their physical addresses.

Figure 3:
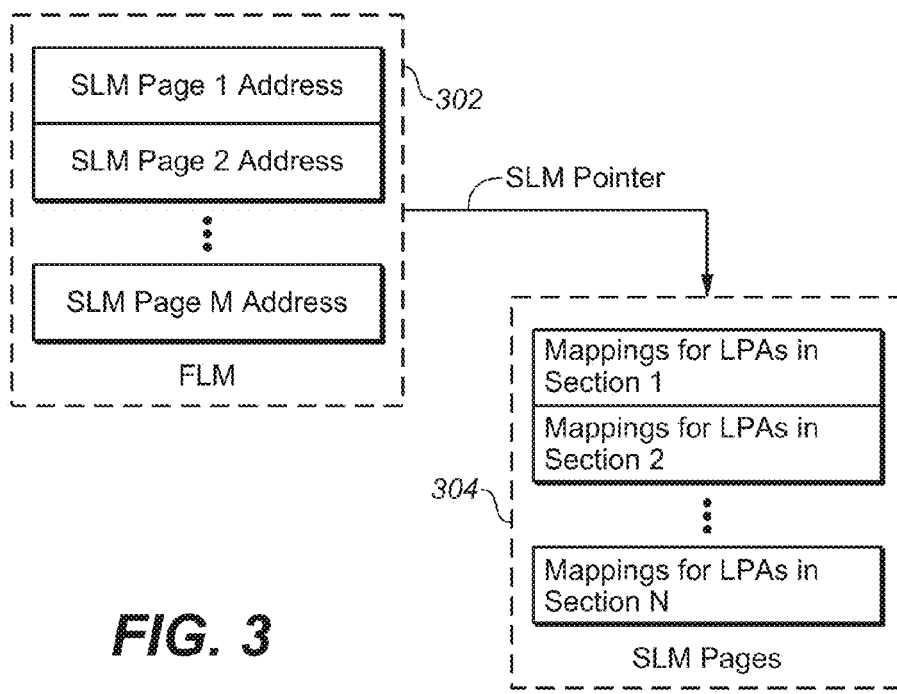
FIG. 3 is an illustration depicting a two-level logical address to physical address mapping.

It is contemplated that in the implementations that arrange and manage the SSD using R-blocks as described above, the mapping between the LPAs and their physical addresses are typically maintained using two-level (or multi-level) maps. For instance, as shown in FIG. 3, a first level map (FLM) 302 can be utilized to store physical addresses of (serving as pointers to) a plurality of second level mapping (SLM) pages 304, and each of the plurality of SLM pages 304 can be utilize to store a set of logical to physical address map entries. In this manner, to obtain the physical address information for a specific LPA, the smaller FLM page can be quickly accessed to locate a particular SLM page that contains the physical address information for the specified LPA. This particular SLM page can then be accessed to obtain the physical address information accordingly.

It is noted that for clarity, a SLM page used for storing a set of logical to physical address map entries is referred to as a "SLM page" in the present disclosure to distinguish it from the pages in the SSD (depicted in FIGS. 1 and 2, for example). The pages in the SSD are referred to as "memory pages", "host pages", or "pages".

It is also noted that the SSD controller needs to perform a process referred to as recycling or garbage collection from time to time to recycle available spaces for reuse. In the implementations that arrange and manage the SSD using R-blocks, to recycle a particular source R-block, the SSD controller needs to find all the valid pages from the source R-block and move them to a different R-block, then the source R-block can be erased and reused as a free R-block. However, valid pages and their locations within a given R-block are not easily determined, especially when a multi-level mapping is used.

Embodiments of the present disclosure are directed to methods and systems for recycling of R-blocks in a solid state drive. In one embodiment, a SLM index record associated with each R-block is utilized to help identifying valid host pages in each particular R-block. By tracking and utilizing SLM indices, the process of identifying valid host pages during the recycling process is simplified, therefore improving the overall efficiency of the recycling process.

In accordance with embodiments of the present disclosure, a SLM index record is generated when a new R-block is written. That is, when the R-block is written, any SLM page that includes an address map entry that refers to a host page in the R-block should be recorded. More specifically, SLM indices of such SLM pages should be inserted into the SLM index record for this R-block. It is noted that the term "index" refers to any identifier that can be used to identify, reference or point to a particular SLM page. In one embodiment, each R-block in the SSD is uniquely associated with its own SLM index record, and the SLM index records for different R-blocks are managed independently. This allows the SSD controller to quickly access any particular SLM index record for any given R-block whenever needed.

Figure 4:
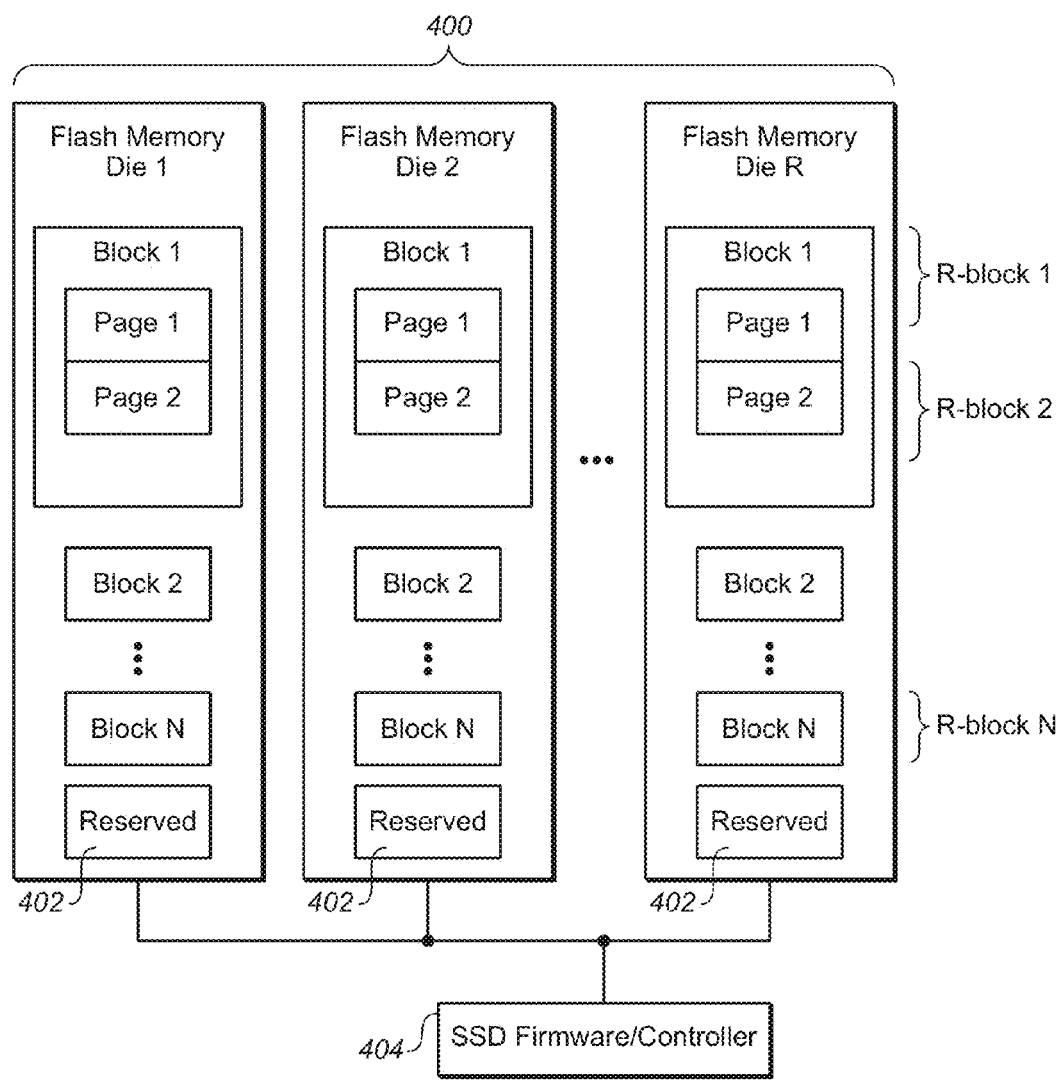
FIG. 4 is an illustration depicting blocks and pages of multiple flash memory dies/chips managed in R-blocks, as well as designated storage areas for storing second level mapping (SLM) index records.

It is contemplated that the SLM index records can be stored in any storage media accessible to the SSD controller. In one embodiment, as illustrated in FIG. 4, the SLM index records are stored in one or more reserved pages in one or more designated blocks 402 available on the flash memory die(s) 400. It is contemplated, however, that the SLM index records can be stored in a different storage media outside of the flash memory dies 400 without departing from the spirit and scope of the present disclosure, as long as the storage media is accessible to the SSD controller 404.

It is also contemplated that the SLM index record for a given R-block needs to be maintained/updated since mapping information changes as new data is written to the R-block. In one embodiment, these SLM index records are updated as a background process. For example, if the system is idle or if the host is mostly issuing read request, the recycling process is not likely to be triggered, and the SSD controller can start to update the SLM index records opportunistically.

It is also noted that since there are multiple R-blocks in the SSD, and each R-block has its own SLM index record, an order can be established to control the SLM index records update sequence. One approach implemented in certain embodiments of the present disclosure is to update the SLM index records for R-blocks that are more likely to be recycled first.

More specifically, the SSD controller maintains a record of valid page count for each R-block. This record can be maintained in data structures such as a table or the like, referred to as the valid page count (VPC) table. Each time a write request for a particular page is received, the SSD controller will first determine whether this page has been written before. If it has been written before, the SSD controller will find the R-block that contain this particular page and subtract the valid page count of this block in the VPC table by 1. The SSD controller then writes this page to a new R-block, and creates a new VPC entry in the VPC table to track the valid page count of this new R-block.

Generally, the SSD recycling process prefers to recycle a R-block with a lower VPC because the number of valid pages that need to be moved to a new R-block is lower. The SSD controller can therefore select several candidate R-blocks that are likely to be recycled base on it current VPC, and update their SLM index records in that order as well. Additionally/alternatively, the SSD controller can establish ordering based on the number of invalid SLM indices recorded in each SLM index record. For instance, in one embodiment, the original VPC of a R-block is recorded in its SLM index record. If the recorded VPC in the SLM index record (original VPC) minus the current VPC of the R-block exceeds a threshold, it means that a lot of pages in this R-block are now invalid, and updating this particular SLM index record will remove a lot of SLM indices originally recorded in the SLM index record but are no longer valid.

Figure 5:
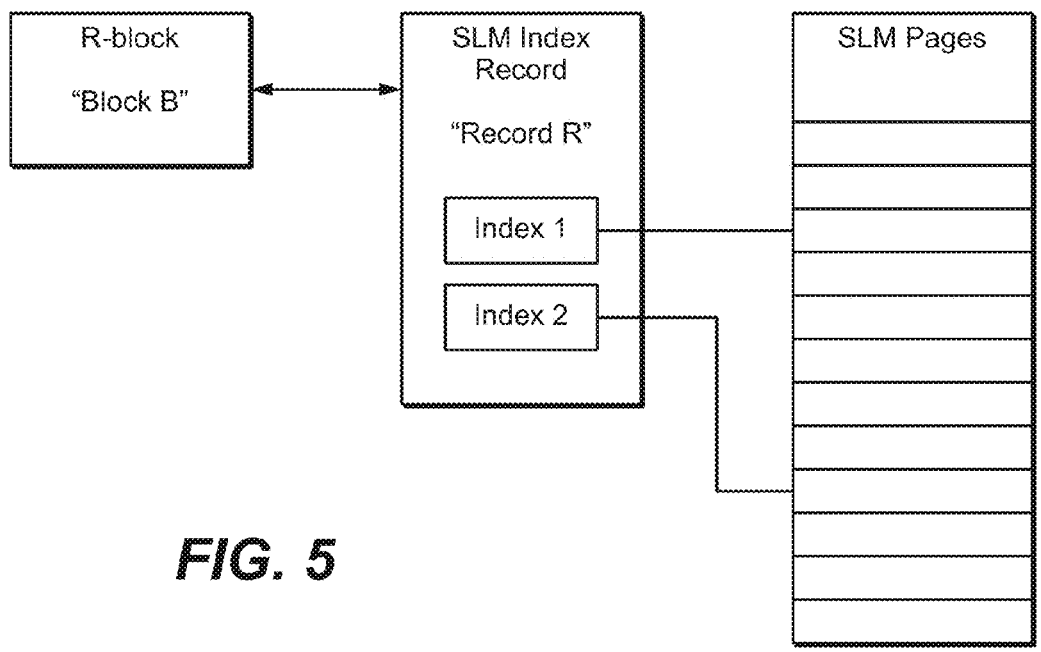
FIG. 5 is an illustration depicting relationships between a R-block, its SLM index record and SLM pages.

Once the SSD controller selects a particular SLM index record to update, the process for updating that SLM index record can be carried out as described below. Referring to FIG. 5, let's denote the SLM index record selected to be updated as "Record R" and the R-block associated with "Record R" as "Block B", the SSD controller should read and process each SLM page referenced by the SLM indices recorded in "Record R". More specifically, for the SLM page referenced by SLM index 1, if none of the map entries stored in that SLM page maps to any physical address that belongs to "Block B", it means that the address map entries stored in this SLM page does not need data stored in "Block B", and SLM index 1 referring to this SLM page should be removed from "Record R". Otherwise, if some of the map entries stored in the SLM page still map to one or more physical addresses that belong to "Block B", SLM index 1 can still stay in "Record R". This process then continues for all SLM indices stored in "Record R".

Figure 6:
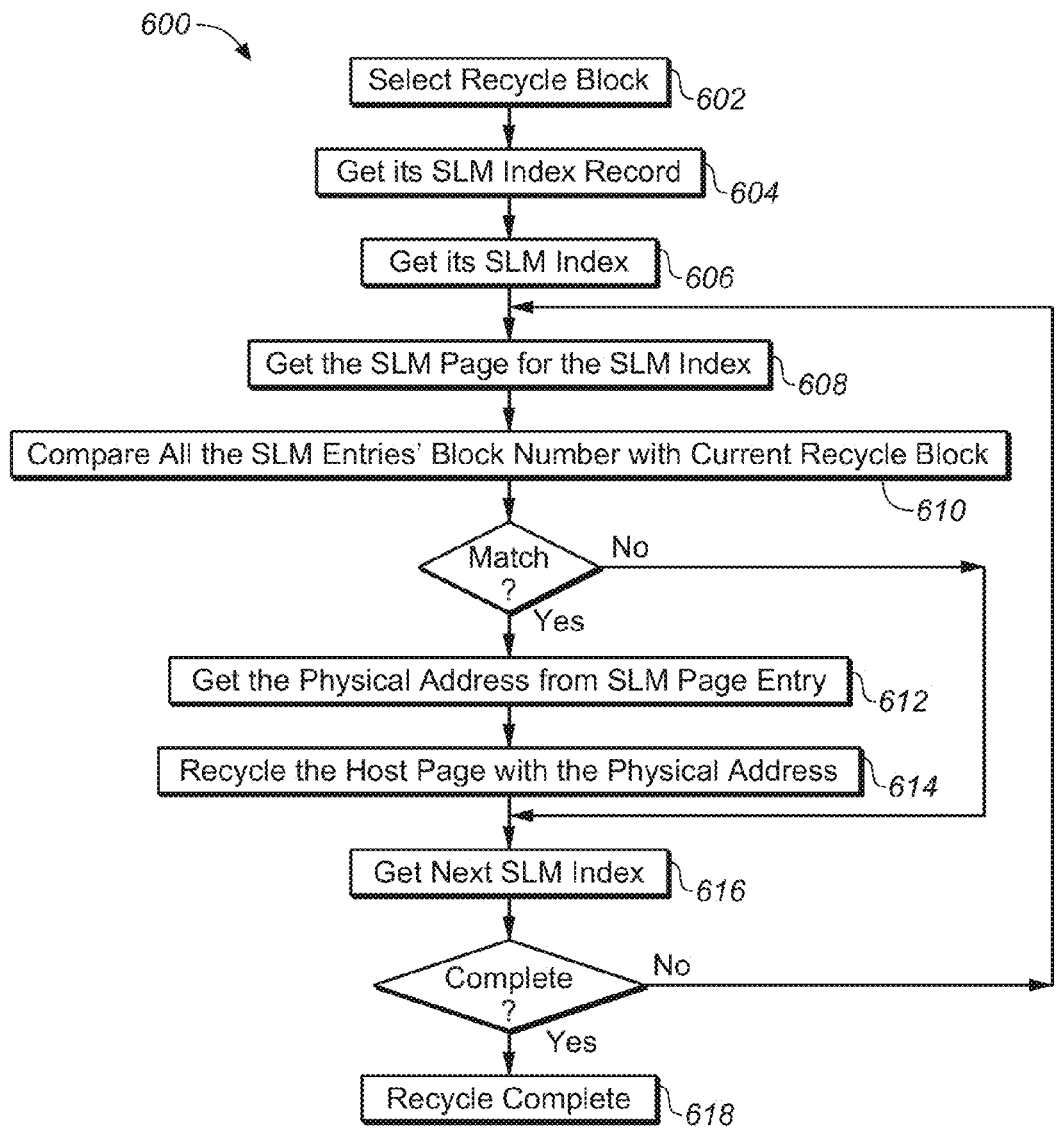
FIG. 6 is a flow diagram illustrating a SLM index record based R-block recycling process.

Upon completion of this update process, SLM pages that do not refer to data stored in "Block B" are no longer referenced by any SLM indices stored in "Record R". In other words, to recycle a particular R-block in accordance with embodiments of the present disclosure, only the SLM pages referenced by the SLM indices stored in the SLM index record for that particular R-block needs to be taken into consideration. This SLM index record based R-block recycling process is illustrated in detail in FIG. 6.

As illustrated in the flow diagram, a candidate R-block is selected in step 602 for recycle, and in one embodiment, the candidate R-block is selected base on its valid page count as described above. Once the R-block is selected, the SLM index record for this R-block is retrieved in step 604 and the first SLM index stored in the SLM index record is subsequently retrieved in step 606. The SLM page referenced by the retrieved SLM index is then accessed in step 608, and in step 610 each map entry in this SLM page is compared to the R-block to determine whether this map entry refers to a location that belongs to the R-block selected for recycling. If one or more map entries stored in the SLM page refer to one or more locations that belong to the R-block, the physical addresses for such locations are obtained in step 612 and the data stored in such locations is moved to a different R-block 614. The recycling process then continues to retrieve the next SLM index stored in the SLM index record in step 616 and repeats the process from step 608 until all SLM indices stored in the SLM index record are processed. The recycling process completes in step 618, and at this point, the R-block selected for recycling can be erased.

It is contemplated that the process for determining whether one or more map entries stored in a SLM page refer to one or more locations that belong to a particular R-block can be implemented in various ways. For instance, each R-block in the system can be assigned a unique identifier, and each map entry in the SLM page can record the identifier of the R-block that it belongs to. This allows matching R-block identifiers to be identified quickly. Alternatively, the physical addresses belonging to a R-block is known and whether a map entry in the SLM page maps to the R-block can be determined by comparing the physical address recorded in the map entry to the physical addresses that are known to belong to the R-block. It is understood that other techniques may also be utilized to determine whether one or more mappings stored in a SLM page map to one or more physical addresses that belong to a particular R-block without departing from the spirit and scope of the present disclosure.

It is noted that the SLM index record based R-block recycling process in accordance with embodiments of the present disclosure does not require the SSD controller to scan the entire R-block in order to identify the valid pages. The SSD controller also does not need to read all SLM pages related to all the logical address in the R-block that is being recycled—only the ones that are associated with the R-block and have not been invalidated by the update process described above.

It is contemplated that the amount of index data maintained in the SLM index record for a given R-block will increase overtime. For instance, if a host writes to a number of various pages in the same R-block, such as a random write, the amount of index data that needs to be recorded in the SLM index record for that R-block increases accordingly. In some embodiment, once the amount of index data stored in the SLM index record for a given R-block exceeds the predetermined threshold, the SLM index record for that particular R-block can be bypassed and the storage media designated for storing the SLM index record for that particular R-block can be deemed conditionally invalid. It is noted that since each R-block in the SSD manages its own SLM index record, the decision as to whether to bypass the SLM index record for a particular R-block can also be made independently as well. In this manner, the R-block that has its SLM index record deemed conditionally invalid can bypass the SLM index record based recycling process while other R-blocks can still utilize the SLM index record based recycling process as described above.

It is also contemplated that while a second level map (SLM) is described in the examples above, such a description is exemplary. A SLM page as described above includes a set of address map entries, and it is contemplated that various other terms can be utilized to refer to a set of address map entries without departing from spirit and scope of the present disclosure. Similarly, a SLM index can be generally referred to as an address map index, and a SLM index record can be generally referred to as an address map index record.

It is further contemplated that the data structures such as the map and table referenced in the description above are merely exemplary. Various data structures such as lists and the like can also be utilized for recording and tracking purposes without departing from the spirit and scope of the present disclosure.

It is understood that the specific order or hierarchy of steps in the foregoing disclosed methods are examples of exemplary approaches. Based upon design preferences, it is understood that the specific order or hierarchy of steps in the method can be rearranged while remaining within the scope of the present invention. The accompanying method claims present elements of the various steps in a sample order, and are not meant to be limited to the specific order or hierarchy presented.

It is believed that the present invention and many of its attendant advantages will be understood by the foregoing description. It is also believed that it will be apparent that various changes may be made in the form, construction and arrangement of the components thereof without departing from the scope and spirit of the invention or without sacrificing all of its material advantages. The form herein before described being merely an explanatory embodiment thereof, it is the intention of the following claims to encompass and include such changes.

What is claimed is:

1. A recycling method for a solid state drive, the method comprising:
    selecting a logical block for recycle, the logical block including a plurality of pages across a plurality of flash dies;
    retrieving an address map index record associated with the logical block selected for recycle;
    for each particular address map index stored in the address map index record, performing the steps of:
        retrieving a set of address map entries referenced by the particular address map index;
        processing each of the plurality of pages included in the logical block and determining whether any page of the plurality of pages included in the logical block is referenced by the set of address map entries; and
        in response to determining that at least one page of the plurality of pages included in the logical block is referenced by the set of address map entries, writing said at least one page to a different logical block; and
    erasing the plurality of pages in the logical block.

2. The method of claim 1, wherein the address map is implemented utilizing a two level map and each set of address map entries is organized as a second level mapping page.

3. The method of claim 1, further comprising:
    recording at least one address map index in the address map index record associated with the logical block when the logical block is written, said at least one address map index refers to at least one address map entry that refers to a page in the logical block.

4. The method of claim 1, further comprising:
    updating the address map index record associated with the logical block.

5. The method of claim 4, wherein updating the address map index record associated with the logical block comprises:
    retrieving the address map index record associated with the logical block;
    for each particular address map index stored in the address map index record, performing the steps of:
        retrieving a set of address map entries referenced by the particular map index;
        determining whether any page in the logical block is referenced by the set of address map entries; and
        in response to determining that none of the pages in the logical block is referenced by the set of address map entries, removing the particular address map index from the address map index record.

6. The method of claim 1, wherein the solid state drive includes a plurality of logical blocks, each logical block of the plurality of logical blocks being uniquely associated with an address map index record.

7. The method of claim 6, wherein a selection criteria is established for selecting at least one address map index record to update, the selection criteria including at least one of: a valid page count of the logical block associated with the address map index record, or a difference between an original valid page count and a current valid page count of the logical block associated with the address map index record.

8. A recycling method for a solid state drive, the solid state drive utilizing a two level map for tracking logical address to physical address mapping, the method comprising:
    selecting a logical block for recycle, the logical block including a plurality of pages across a plurality of flash dies;
    retrieving a second level map (SLM) index record associated with the logical block selected for recycle;
    for each particular SLM index stored in the SLM index record, performing the steps of:
        retrieving a SLM page referenced by the particular SLM index;
        processing each of the plurality of pages included in the logical block and determining whether any page of the plurality of pages included in the logical block is referenced by map entries in the SLM page; and
        in response to determining that at least one page of the plurality of pages included in the logical block is referenced by the map entries in the SLM page, writing said at least one page to a different logical block; and
    erasing the plurality of pages in the logical block.

9. The method of claim 8, further comprising:
    recording at least one SLM index in the SLM index record associated with the logical block when the logical block is written, said at least one SLM index refers to at least one SLM page that refers to a page in the logical block.

10. The method of claim 8, further comprising:
    updating the SLM index record associated with the logical block.

11. The method of claim 10, wherein updating the SLM index record associated with the logical block comprises:
    retrieving the SLM index record associated with the logical block;
    for each particular SLM index stored in the SLM index record, performing the steps of:
        retrieving a SLM page referenced by the particular SLM index;
        determining whether any page in the logical block is referenced by map entries in the SLM page; and
        in response to determining that none of the pages in the logical block is referenced by the map entries in the SLM page, removing the particular SLM index from the SLM index record.

12. The method of claim 8, wherein the solid state drive includes a plurality of logical blocks, each logical block of the plurality of logical blocks being uniquely associated with a SLM index record.

13. The method of claim 12, wherein a selection criteria is established for selecting at least one SLM index record to update, the selection criteria including at least one of: a valid page count of the logical block associated with the SLM index record, or a difference between an original valid page count and a current valid page count of the logical block associated with the SLM index record.

14. A solid state drive, comprising:
a plurality of flash dies, each of the plurality of flash dies including a plurality of blocks, each of the plurality of blocks further including a plurality of pages for providing data storage; and
a controller for managing a recycle operation for the solid state drive, wherein the recycle operation is performed in units of logical blocks, wherein each logical block includes a plurality of pages across at least a subset of the plurality of flash dies, and wherein upon receiving a recycle request, the controller is configured to:
select a logical block for recycle;
retrieve an address map index record associated with the logical block selected for recycle;
for each particular address map index stored in the address map index record, perform the steps of:
retrieve a set of address map entries referenced by the particular address map index;
process each of the plurality of pages included in the logical block and determine whether any page of the plurality of pages included in the logical block is referenced by the set of address map entries; and
in response to at least one page of the plurality of pages included in the logical block being referenced by the set of address map entries, write said at least one page to a different logical block; and
erase the plurality of pages in the logical block.

15. The solid state drive of claim 14, wherein the address map is implemented utilizing a two level map and each set of address map entries is organized as a second level mapping page.

16. The solid state drive of claim 14, wherein the controller is further configured to:
record at least one address map index in the address map index record associated with the logical block when the logical block is written, said at least one address map index refers to at least one address map entry that refers to a page in the logical block.

17. The solid state drive of claim 14, wherein the controller is further configured to:
update the address map index record associated with the logical block.

18. The solid state drive of claim 17, wherein the controller updates the address map index record by performing the steps of:
retrieve the address map index record associated with the logical block;
for each particular address map index stored in the address map index record, perform the steps of:
retrieve a set of address map entries referenced by the particular map index;
determine whether any page in the logical block is referenced by the set of address map entries; and
in response to determining that none of the pages in the logical block is referenced by the set of address map entries, remove the particular address map index from the address map index record.

19. The solid state drive of claim 14, wherein the solid state drive includes a plurality of logical blocks, each logical block of the plurality of logical blocks being uniquely associated with an address map index record.

20. The solid state drive of claim 19, wherein a selection criteria is established by the controller to select at least one address map index record to update, the selection criteria including at least one of: a valid page count of the logical block associated with the address map index record, or a difference between an original valid page count and a current valid page count of the logical block associated with the address map index record.

* * * * *